United States Patent
Voss (10) Patent No.: US 10,626,996 B2
(45) Date of Patent: Apr. 21, 2020

(54) SOLENOID VALVE, IN PARTICULAR FOR A MOTOR VEHICLE PNEUMATIC SUSPENSION SYSTEM

(71) Applicant: Continental Teves AG & Co. oHG, Frankfurt (DE)

(72) Inventor: Christoph Voss, Frankfurt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 16/080,176

(22) PCT Filed: Feb. 23, 2017

(86) PCT No.: PCT/EP2017/054104
§ 371 (c)(1),
(2) Date: Aug. 27, 2018

(87) PCT Pub. No.: WO2017/148776
PCT Pub. Date: Sep. 8, 2017

(65) Prior Publication Data
US 2019/0049020 A1    Feb. 14, 2019

(30) Foreign Application Priority Data
Mar. 1, 2016  (DE) .................. 10 2016 203 309

(51) Int. Cl.
*F16K 1/46* (2006.01)
*F16K 1/36* (2006.01)
(Continued)

(52) U.S. Cl.
CPC .................. *F16K 1/46* (2013.01); *F16F 9/34* (2013.01); *F16K 1/36* (2013.01); *F16K 25/005* (2013.01);
(Continued)

(58) Field of Classification Search
CPC . F16K 1/46; F16K 25/005; F16K 1/36; F16K 31/0655; F16K 31/0689; F16F 9/34
(Continued)

(56) References Cited

U.S. PATENT DOCUMENTS 2,735,047 A * 2/1956 Garner et al. ...... F16K 31/0655
335/245
2,757,688 A * 8/1956 Klingler ................ F16K 11/052
137/625.44
(Continued)

FOREIGN PATENT DOCUMENTS

CN    1519150 A    8/2004
CN    101324289 A    12/2008
(Continued)

OTHER PUBLICATIONS

Chinese Office Action for Chinese Application No. 201780014540.7, dated Apr. 2, 2019, with translation, 14 pages.
(Continued)

*Primary Examiner* — John Bastianelli
(74) *Attorney, Agent, or Firm* — RatnerPrestia (57) ABSTRACT

An electromagnetic valve, in particular for a motor vehicle air spring system, has a valve closing body which, in its basic position, shuts off a valve outlet and, for this purpose, is pressed against a valve seat by a restoring spring. To assist the opening process, a valve spring is also provided. The valve spring is supported at one side on a valve seat body and at the other side on a spring pot, which is arranged on the valve closing body. Preferably, a tubular section of the spring pot bears, non-displaceably in a lateral direction, directly against the valve closing body. An elastic sealing element may either be arranged on the end side of the valve closing body, or held laterally by a section, which forms an enclosure, of the spring pot.

11 Claims, 10 Drawing Sheets

(51) Int. Cl.
*F16K 31/06* (2006.01)
*F16F 9/34* (2006.01)
*F16K 25/00* (2006.01)

(52) U.S. Cl.
CPC ...... *F16K 31/0655* (2013.01); *F16K 31/0689* (2013.01)

(58) Field of Classification Search
USPC ........................................ 251/129.15, 129.02
See application file for complete search history.

(56) References Cited

U.S. PATENT DOCUMENTS

| | | | | |
|---|---|---|---|---|
| 3,829,060 A | * | 8/1974 | von Lewis | ............ B60T 8/363 251/129.02 |
| 4,251,052 A | * | 2/1981 | Hertfelder | ............ H01F 7/1607 251/129.02 |
| 4,522,372 A | * | 6/1985 | Yano | ................. F16K 31/0675 251/129.02 |
| 4,582,088 A | * | 4/1986 | Cook | ............... F16K 31/0627 137/625.5 |
| 4,936,543 A | * | 6/1990 | Kamibayasi | ........ F16K 31/0658 251/121 |
| 5,167,442 A | * | 12/1992 | Alaze | ................... B60T 8/365 251/129.02 |
| 5,248,124 A | * | 9/1993 | Nugent | ................... F16K 31/04 251/129.11 |
| 5,358,005 A | * | 10/1994 | van Prooijen | ...... F16K 31/0655 137/244 |
| 5,401,087 A | * | 3/1995 | Goossens | ............... B60T 8/363 251/129.02 |
| 5,496,100 A | * | 3/1996 | Schmid | ................. B60T 8/365 251/129.19 |
| 5,915,669 A | * | 6/1999 | Zabeck | ............... F16K 31/0655 251/129.02 |
| 6,120,003 A | * | 9/2000 | Lubischer | ............... B60T 8/365 251/129.02 |
| 6,273,396 B1 | * | 8/2001 | Kato | ................... F16K 31/0655 251/129.21 |
| 6,929,240 B2 | * | 8/2005 | Ueda | ........................ F16K 7/20 251/129.02 |
| 7,857,282 B2 | * | 12/2010 | Goossens | ............... B60T 8/363 251/129.02 |
| 8,028,970 B2 | | 10/2011 | Fukano et al. | |
| 8,387,946 B2 | * | 3/2013 | Itoafa | .................. F16K 31/0693 251/129.02 |
| 2001/0002237 A1 | * | 5/2001 | Ota | ..................... F04B 27/1804 417/222.2 |
| 2094/0135429 | | 7/2004 | Yang | |

FOREIGN PATENT DOCUMENTS

| | | |
|---|---|---|
| DE | 102012218321 A1 | 4/2014 |
| DE | 102013217580 A1 | 3/2015 |
| DE | 102014210066 A1 | 12/2015 |
| DE | 102014212322 A1 | 12/2015 |
| DE | 102014213235 A1 | 1/2016 |
| EP | 1437277 A1 | 7/2004 |

OTHER PUBLICATIONS

German Search Report for German Application No. 10 2016 203 309.3, dated Oct. 16, 2017, with partial translation—11 pages.
International Search Report and Written Opinion for International Application No. PCT/EP2017/054104, dated May 16, 2017—12 pages.
Korean Notice of Reason for Refusal for Korean Application No. 10-2018-7025144, dated Nov. 21, 2019 with translation, 6 pages.

* cited by examiner

SOLENOID VALVE, IN PARTICULAR FOR A MOTOR VEHICLE PNEUMATIC SUSPENSION SYSTEM

CROSS REFERENCE TO RELATED APPLICATIONS

This application is the U.S. National Phase Application of PCT International Application No. PCT/EP2017/054104, filed Feb. 23, 2017, which claims priority to German Patent Application No. 10 2016 203 309.3, filed Mar. 1, 2016, the contents of such applications being incorporated by reference herein.

FIELD OF THE INVENTION

The invention relates to an electromagnetic valve, in particular for a motor vehicle air spring system, having a valve housing in which there are arranged a valve closing body and a valve seat body which has a valve seat and a valve outlet, wherein the valve closing body is displaceable relative to the valve seat in an opening and a closing direction in order to open or close the valve outlet, having a magnet armature which forms an assembly together with the valve closing body, and having a restoring spring which acts on the assembly in a closing direction and having a valve spring which acts on the assembly in an opening direction, wherein, to the end of the valve closing body facing toward the valve seat, there is fastened an elastic sealing element which is capable of bearing sealingly against the valve seat.

BACKGROUND OF THE INVENTION

An electromagnetic valve of said type is described for example in DE 10 2014 213 235 A1, incorporated by reference herein.

To realize a secure hold of the sealing element on the valve closing body, said valve closing body is equipped with an undercut. The sealing element has an inwardly pointing collar which engages into said undercut.

To produce a valve closing body with a sealing element, either a prefabricated sealing element is fitted onto the valve closing body, or the valve closing body is overmolded with a plastic for the purposes of molding a sealing element on. Both methods have their disadvantages: A fitting-on process can be automated only with difficulty. In the case of overmolding, cavities may arise in the undercut, which cavities impair the functionality of the sealing element. In both cases, a high reject rate is to be expected.

Geometric alterations to the valve closing body and to the sealing element are scarcely possible, because the support surface on the valve closing body for the valve spring cannot be relocated without the valve spring having to be lengthened.

SUMMARY OF THE INVENTION

An aspect of the invention aims to provide an electromagnetic valve with a valve closing body, which electromagnetic valve is reliably actuatable, wherein the sealing element can be easily and reliably installed. It is furthermore sought to realize optimized support for the valve spring.

An aspect of the invention provides a spring pot on the valve closing body, which spring pot has a tubular section which surrounds the valve closing body. The spring pot has a collar on which the valve spring is supported.

Since the support surface is accordingly formed no longer on the valve closing body itself but on a spring pot, design freedoms are achieved for determining the position of the support surface in relation to the valve closing body.

The use of a spring pot makes it possible in particular for the width of an undercut on the valve closing body for receiving a collar of the sealing element to be increased.

The spring pot for supporting the valve spring is for example folded over onto the sealing element. Here, there is however the risk of the spring pot being displaced laterally on the sealing element, which consequently again has an adverse effect on the valve characteristic.

An aspect of the invention therefore provides for the spring pot to have a tubular section which bears, non-displaceably in a lateral direction, directly against the valve closing body.

In a simple embodiment, the section of the spring pot is held with an interference fit on the shell surface of the valve closing body. For this purpose, the spring pot need only have a relatively short tubular section, which does not project beyond the end side of the valve closing body.

Since the position of the fastening point for the spring pot on the valve closing body is freely selectable, the position of the collar and thus the position of the support surface for the valve spring can be freely determined.

Preferably, that end of the tubular section which is averted from the collar ends at the shell surface, wherein the sealing element is arranged in a depression on the end surface of the valve closing body. The depression may for example be milled into the end surface of the valve closing body.

Here, however, to dispense with a corresponding milling process by means of which the depression must be machined out of the end surface of the valve closing body, provision may also be made for that end of the tubular section which is averted from the collar to project beyond the end surface, and for that part of the section which projects beyond the end surface to form an enclosure for the sealing element. In this case, the end surface may be left planar, because the lower part of the tubular section of the spring pot projects beyond the end surface and holds the sealing element on all sides.

In a further embodiment, the spring pot may be equipped with a base which bears against the end surface of the valve closing body. Here, the sealing element is likewise designed as a pot, specifically with a base and with an encircling wall. The sealing element is mounted onto the spring pot, such that the inner surface of the base bears against the base of the spring pot, while the inner side of the encircling wall bears against the tubular section of the spring pot.

Since the base of the spring pot is closed, the valve closing body may also be equipped with a longitudinal bore. This makes the valve closing body lighter, such that switching processes can take place more quickly. The base of the spring pot closes off the longitudinal bore in sealed fashion to one side.

In a further embodiment of the invention, the valve closing body is formed as a guide sleeve, wherein the spring pot is mounted onto the guide sleeve with an interference fit, and said guide sleeve is guided with a clearance fit on an elongation, formed as a guide pin, of the magnet armature. This permits simple installation. Firstly, the rubber element is molded onto the spring pot. Said spring pot is then pressed onto the guide sleeve. The structural unit thus created can be pushed onto the guide pin of the magnet armature.

In a further embodiment of the invention, the spring pot may be omitted. For this purpose, the valve closing body has a piston collar on which the valve spring is supported. Here, the valve element may either be recessed in a depression on the end surface of the valve closing body, or else—as already described above—may be of pot-shaped design and bear both against the end side of the valve closing body and against the shell surface thereof.

The valve spring itself is arranged coaxially with respect to the sealing element and at the height thereof.

In these embodiments, provision may likewise be made for the valve closing body to be connected via an intermediate body to the magnet armature. Here, the intermediate body is composed of a rod with an encircling collar in its central section. The two ends of the rod are inserted at one side in a blind bore in the valve closing body and at the other side in a longitudinal bore of the magnet armature. The collar is situated between the end surfaces of magnet armature and valve closing body.

In a further embodiment, the valve closing body has a rod-shaped elongation which protrudes into the longitudinal bore of the magnet armature. Between the two end sides, there is also situated an intermediate body, which is composed of a sleeve with an encircling collar. The collar bears against the end side of the magnet armature, whereas the sleeve protrudes into an encircling depression on the upper end side of the valve closing body.

BRIEF DESCRIPTION OF THE DRAWINGS

Aspects of the invention will be explained in more detail below on the basis of multiple exemplary embodiments of the invention. In the figures.

DETAILED DESCRIPTION OF THE PREFERRED EMBODIMENTS

Figure 1:
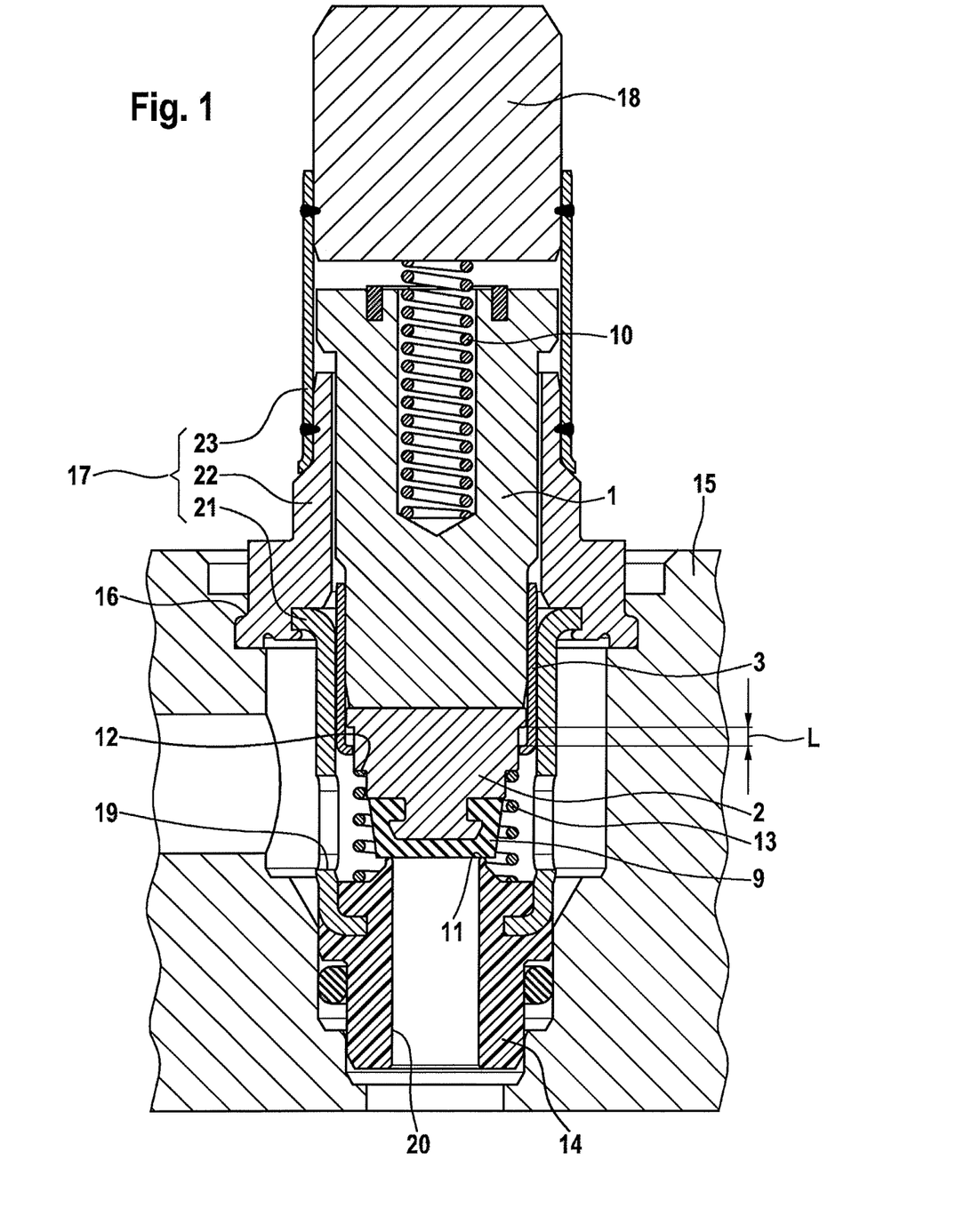
FIG. 1 shows an embodiment of the valve according to the prior art, with the fundamental overall construction of the valve according to an aspect of the invention also being illustrated.

FIG. 1 shows an electromagnetic valve in longitudinal section, with a multi-part valve housing 17. Said valve housing has a lower housing region 21, which is produced in a deep-drawing process. The lower housing region 21 is fixed to a massive central housing section 22. The massive steel housing section 22, which is produced as a drop-forged part and which conducts the magnetic flux, is adjoined by a thin-walled sleeve 23, which does not conduct the magnetic flux and which is preferably manufactured from high-grade steel and which is closed off by a plug-like magnet core 18. The magnet core 18 is also composed of an inexpensive drop-forged part manufactured with sufficient accuracy, which is laser-welded to the sleeve 23 at the outer circumference.

The electromagnetic valve designed as a valve cartridge is, in the region of the massive steel housing section 22, fastened by means of an external caulking in a light metal valve block 15 produced preferably from extruded material, for which purpose the light metal is plastically displaced against a shoulder 16 of the steel housing section 22, which steel housing section is supported, averted from the shoulder 16, on a bore step of the valve block 15.

Below the magnet core 18, there is situated a magnet armature 1 which is guided in the sleeve 23 and which is produced, likewise in a very inexpensive manner, from a circular or polygonal profile by drop forging or extrusion. In the valve basic position, the magnet armature 1, by means of the valve closing body 2 attached movably to the narrowed magnet armature projection, closes a valve outlet 20, provided in a valve seat body 14 of the cartridge-like valve housing 17, under the action of a restoring spring 10. The valve seat body 14 has a valve seat 11 in the form of a web, which surrounds the upper mouth of the valve outlet 20, on the upper end side of the valve seat body 14. The valve closing body 2 is designed as a valve piston which is subjected to the action of a valve spring 13 which lifts the valve closing body 2 off the valve seat 11.

A pressure medium inlet 19 opens laterally into the valve housing 17 at the height of the valve closing body 2. Adjacent below the valve seat 11 is the valve outlet 20, which is formed by a longitudinal bore in the valve seat body 14.

To be able to open up large passage cross sections in combination with a large valve stroke, the magnet armature 1 and the piston-like valve closing body 2 are connected so as to be movable relative to one another in accordance with the telescopic principle in a stroke direction, for which purpose a driver 3 is formed on the magnet armature 1, such that, during an electromagnetic actuation, the magnet armature 1, after a defined armature stroke in the direction of the magnet core 18, during which simultaneously the driver 3 covers an idle travel L before making contact with the valve closing body 2, lifts the valve closing body 2 off from the valve seat 11 by means of the driver 3, with assistance from a valve spring 13.

The magnet armature 1 forms, together with the driver 3 and the valve closing body 2, an independently handleable and pre-testable assembly, such that the driver 3, during a magnet armature travel performed in the direction of the magnet core 18, mechanically engages in a straightforward manner with the valve closing body 2 after the so-called idle travel L has been passed through.

In order that, after the electromagnetic actuation of the magnet armature 1, the valve passage 20 is fully opened up, the valve closing body 2 has a piston collar 12 which is permanently acted on in the valve opening direction by the valve spring 13, which piston collar is supported with its end averted from the valve closing body 2 on the valve seat body 14.

In order to achieve a flawless, quiet valve closure, that end surface of the valve closing body 2 which faces toward the valve seat 11 has an elastically deformable sealing element 9, which in the closed position of the valve bears against the valve seat 11.

FIG. 1 shows the electromagnetic valve in the electromagnetically non-excited, closed valve basic position, in which that piston surface of the valve closing body 2 which faces toward the magnet armature 1 bears against the end surface of the magnet armature 1 under the action of the restoring spring 10.

Basically, the valve spring 13 is designed so as to have a spring force adequate for fully opening the valve, which spring force is however, for the reliable closure of the valve passage 20 in the valve basic position, configured to be lower than the closing force of the restoring spring 10.

The following figures illustrate an aspect of the invention and, in this regard, show in each case a partial section of the valve, specifically the region around the valve closing body. Where modifications are not explicitly mentioned, the valves according to an aspect of the invention are constructed similarly to the valve according to FIG. 1. Modifications in relation to the basic form shown in FIG. 1 arise in particular with regard to an additional spring pot 28 and with regard to the design, arrangement and fastening of the sealing element 9.

Figure 2:
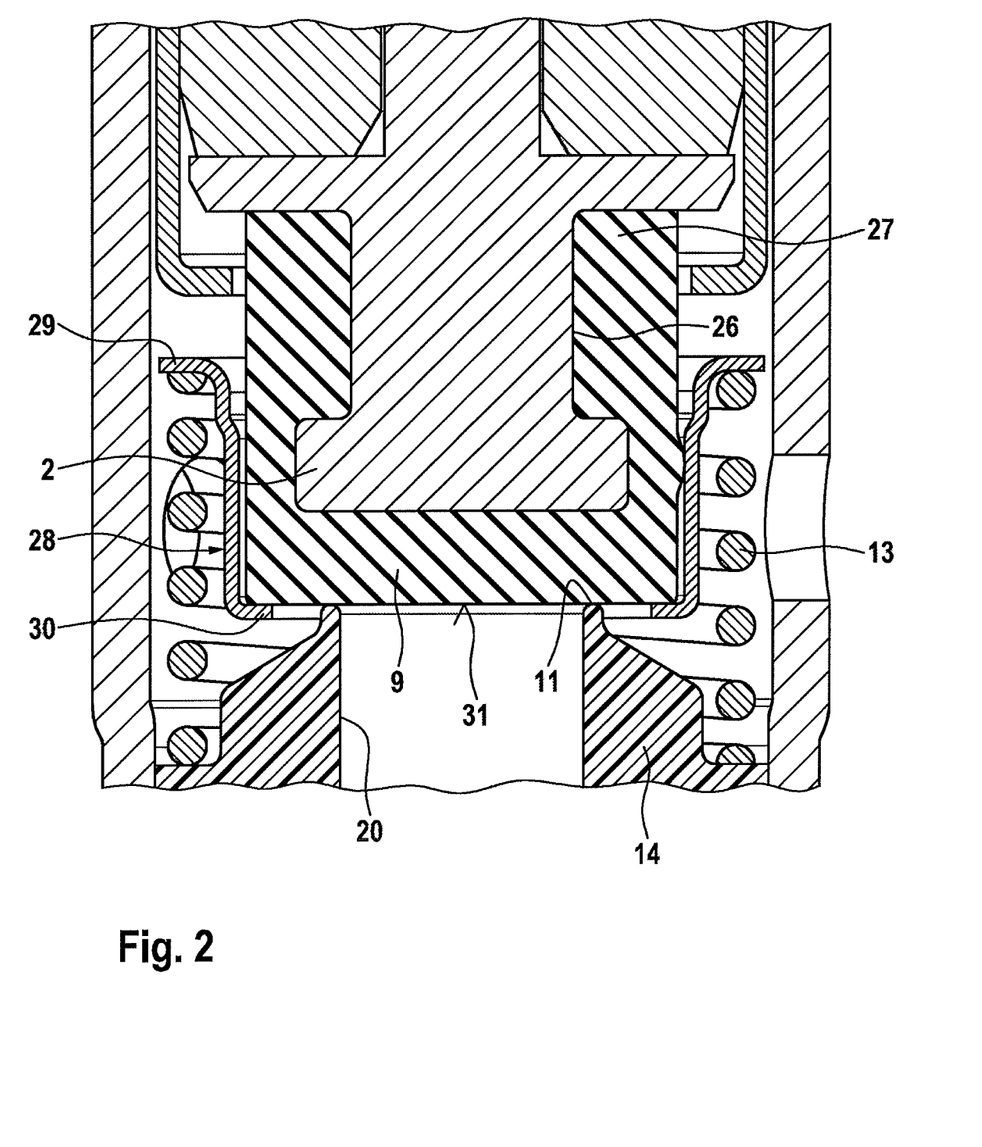
FIG. 2 shows a longitudinal section through the central part of the valve designed in accordance with a first embodiment of an aspect of the invention.

In FIG. 2, the valve closing body 2 has an undercut 26 in the form of a groove with a relatively broad base. An inwardly directed collar 27 of the sealing element 9 can therefore be relatively easily fitted into the undercut 26, or the sealing element 9 can be molded, in a manner free from cavities, onto the mushroom-shaped end, formed by the undercut 26, of the valve closing body 2. The widening of the groove in relation to the embodiment as per FIG. 1 however means that the piston collar 12 on the valve closing body 2 as per FIG. 1, on which the valve spring 13 is supported, is further remote from the valve seat 11. Therefore, in FIG. 2, a spring pot 28 is provided, which is folded over onto the sealing element 9. For this purpose, the spring pot 28 has, on one end thereof, an outwardly pointing collar 29, on which the valve spring 13 is now supported, and on the other end thereof, an inwardly pointing collar 30, which engages under the edge of the sealing surface 31 of the sealing element 9. Here, the inner region of the sealing surface 31 of the sealing element remains free, such that the valve seat 11 can bear directly against the sealing surface 31 of the sealing element 9 in order to close the valve outlet 20.

Figure 3:
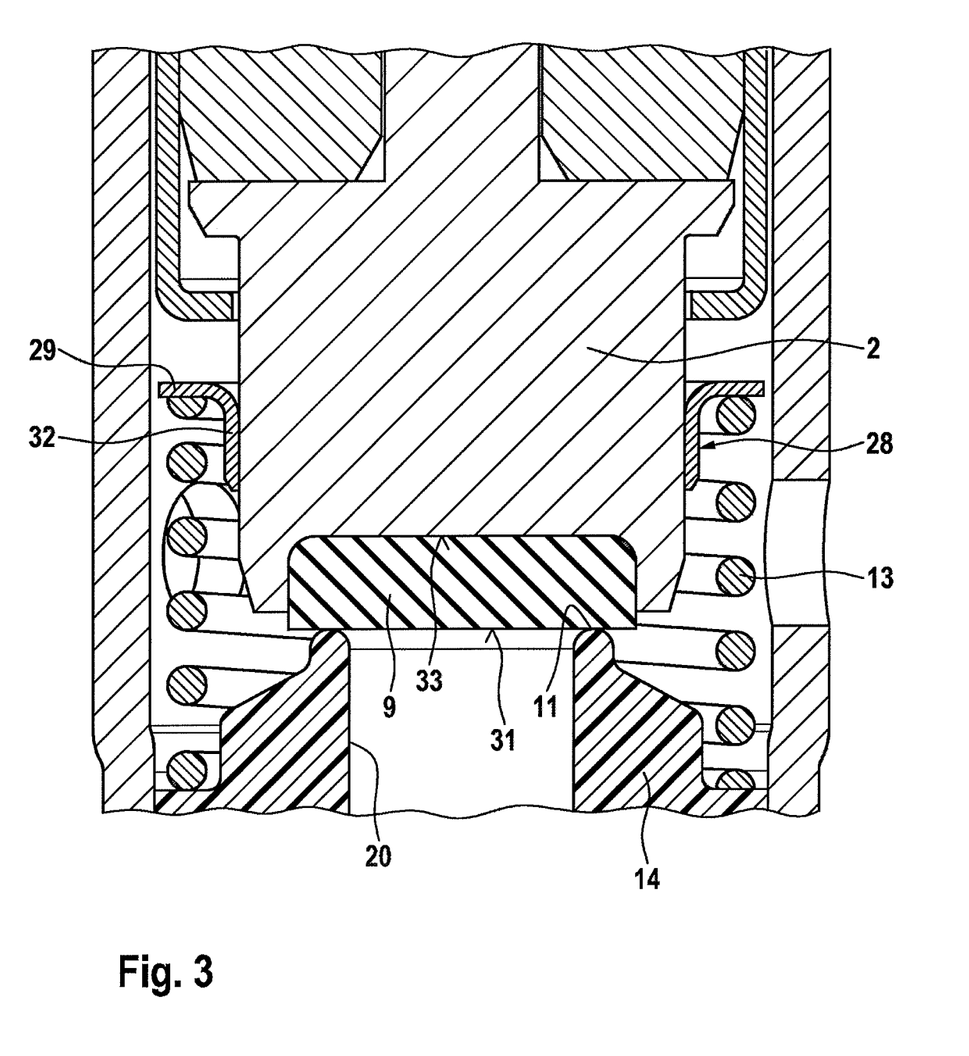
FIG. 3 shows a longitudinal section through the central part of the valve designed in accordance with a second embodiment of an aspect of the invention.

In FIG. 3, a spring pot 28 is likewise provided, which however has no inwardly directed collar but merely an outwardly pointing collar 29 for supporting the valve spring 13. The valve closing body 2 is of cylindrical design, wherein the spring pot 28 is pressed with its tubular section 32 onto the shell surface of the valve closing body 2.

A depression 33 is milled in on the lower end side of the valve closing body 2, in which depression the sealing element 9, which in this case is of disk-shaped form, lies, the exposed sealing surface 31 of which sealing element bears sealingly against the valve seat 11 in the closed position illustrated here.

The valve spring 13 extends between the lower side of the collar 29 and a shoulder on the valve seat body 14.

Figure 4:
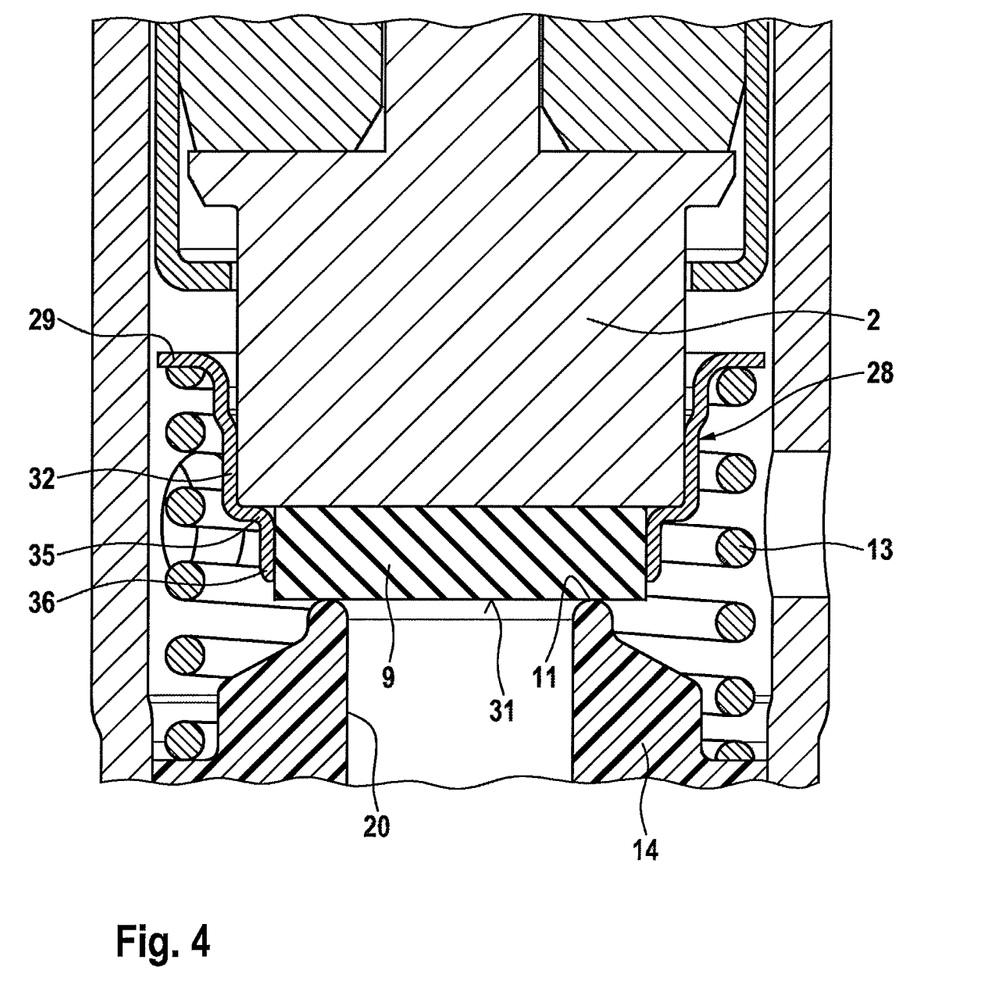
FIG. 4 shows a longitudinal section through the central part of the valve designed in accordance with a third embodiment of an aspect of the invention.

In FIG. 4, the embodiment as per FIG. 3 has been modified such that the spring pot 28 has an elongated tubular section 32, the lower section 35 of which projects beyond the lower end surface of the valve closing body 2 and, there, has a doubly inwardly cranked configuration, such that the lower section 35 forms an enclosure 36 for the sealing element 9 which—because it is held by the enclosure—now does not require a depression in the end surface of the valve closing body 2.

However—as is also already the case in the preceding embodiments as per FIGS. 1 to 3—it is possible here for the sealing element to be fixed to the valve closing body by means of a bonding agent (adhesive).

Figure 5:
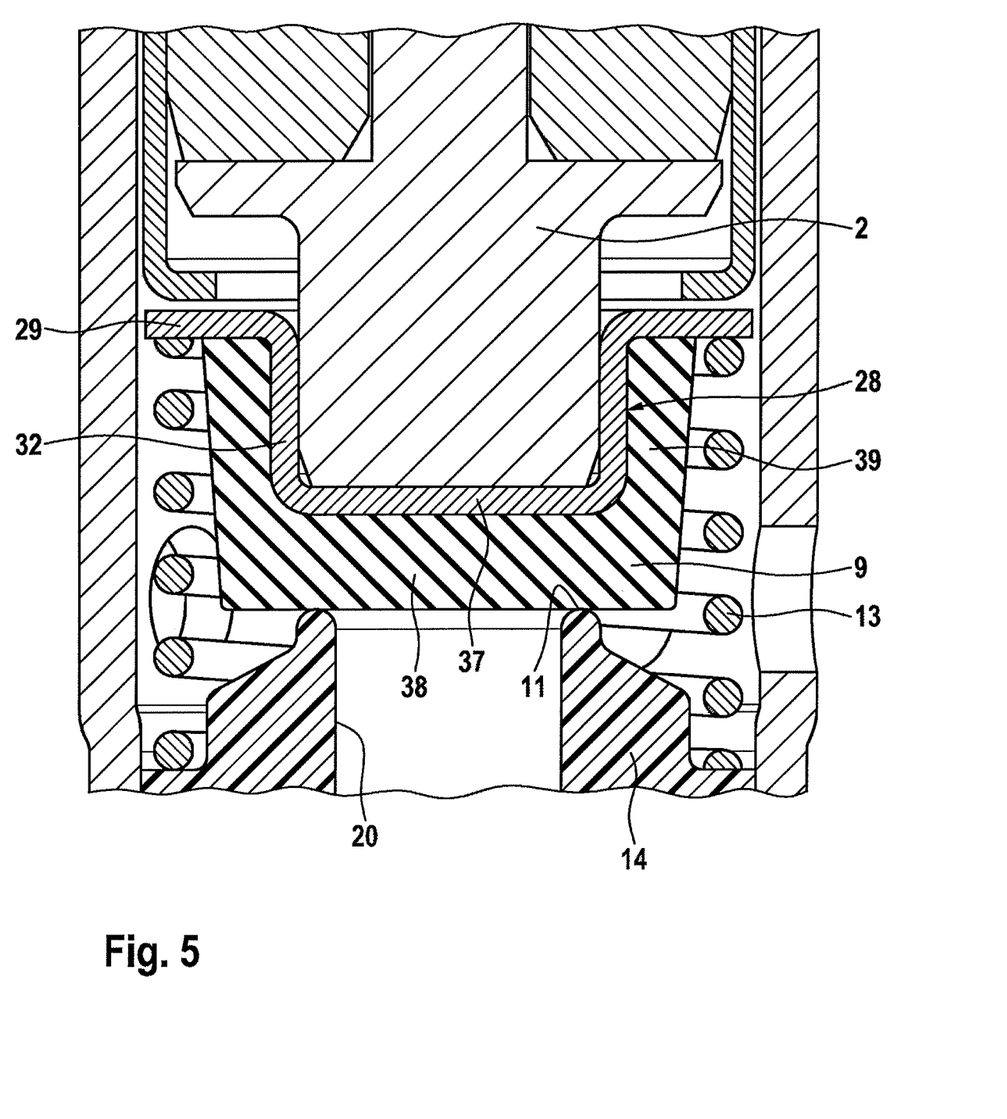
FIG. 5 shows a longitudinal section through the central part of the valve designed in accordance with a fourth embodiment of an aspect of the invention.

In an embodiment as per FIG. 5, the spring pot 28 has a continuous base 37, which is situated in front of the end surface of the valve closing body 2. The spring pot 28 is, for secure hold, pressed onto the valve closing body 2.

The sealing element 9 is designed as a pot with a base 38 and with an encircling wall 39. The inner side of the base 38 of the sealing element 9 bears against the base 37 of the spring pot 28, whereas the inner side of the wall 39 lies against the tubular section 32 of the spring pot 28. The upper edge of the wall 39 extends as far as the collar 29. Here, too, stronger fixing can be achieved using a bonding agent.

The outwardly pointing collar 29 of the spring pot 28 projects beyond the outer diameter of the sealing element 9, such that, in the outer region thereof, a support surface for the valve spring 13 is realized.

Figure 6:
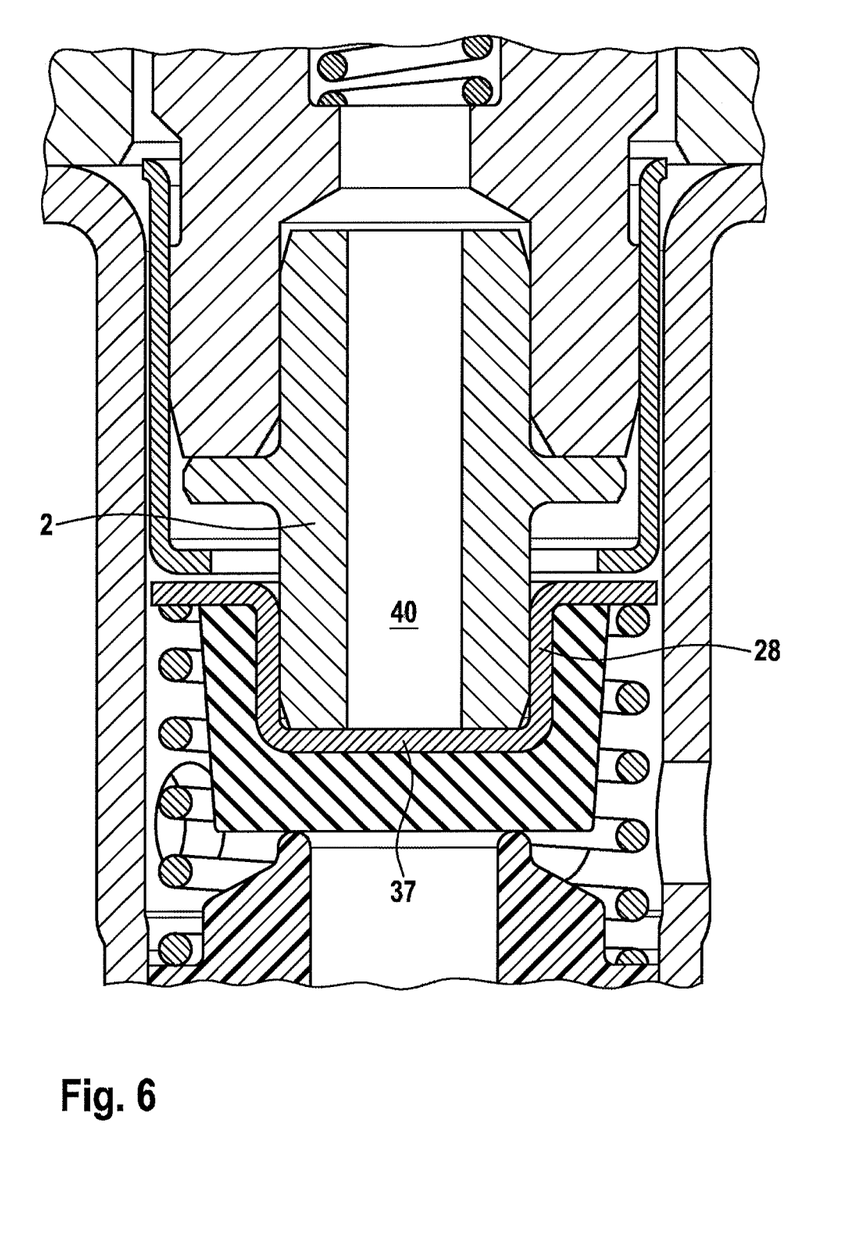
FIG. 6 shows a longitudinal section through the central part of the valve designed in accordance with a fifth embodiment of an aspect of the invention.

As can be seen from FIG. 6, it is possible in this case for the valve closing body 2 to be equipped with a longitudinal bore 40. This makes said valve closing body lighter, such that a faster switching time can be expected. The base 37 of the spring pot 28 closes one end of said longitudinal bore 40.

Figure 7:
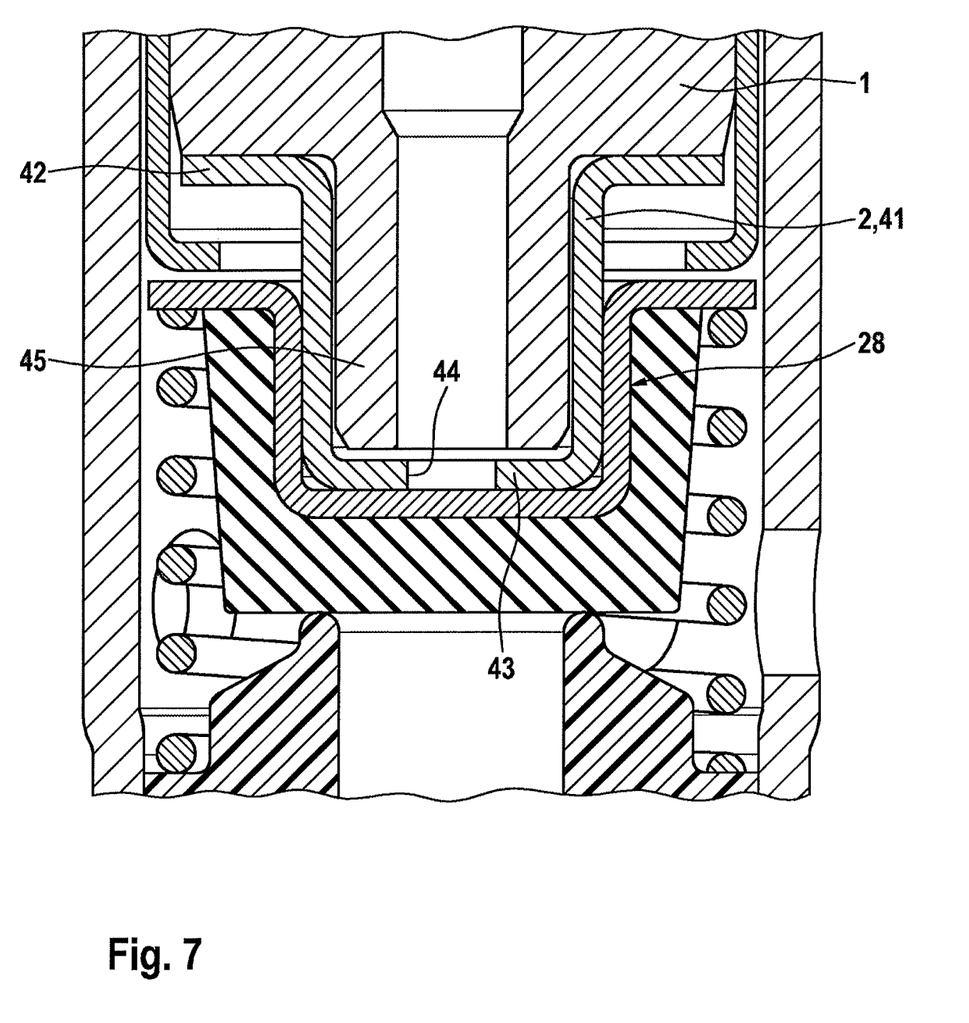
FIG. 7 shows a longitudinal section through the central part of the valve designed in accordance with a sixth embodiment of an aspect of the invention.

In particular in the latter embodiment, a further variation is also possible, which is illustrated in FIG. 7. The valve closing body 2 is designed as a guide sleeve 41 in the form of a deep-drawn part 41.

The guide sleeve 41 is likewise of pot-shaped design, with an outwardly pointing collar 42, with a tubular section and with a base 43 in which there is possibly situated an opening 44 which is aligned with a longitudinal bore in the magnet armature 1.

The magnet armature 1 has, in its axis, an elongation 45 which serves as a guide pin and which is of smaller diameter than the main part of said magnet armature. The guide sleeve 41 is guided on said elongation. The spring pot 28 is pressed onto the outer side of the guide sleeve 41.

Figure 8:
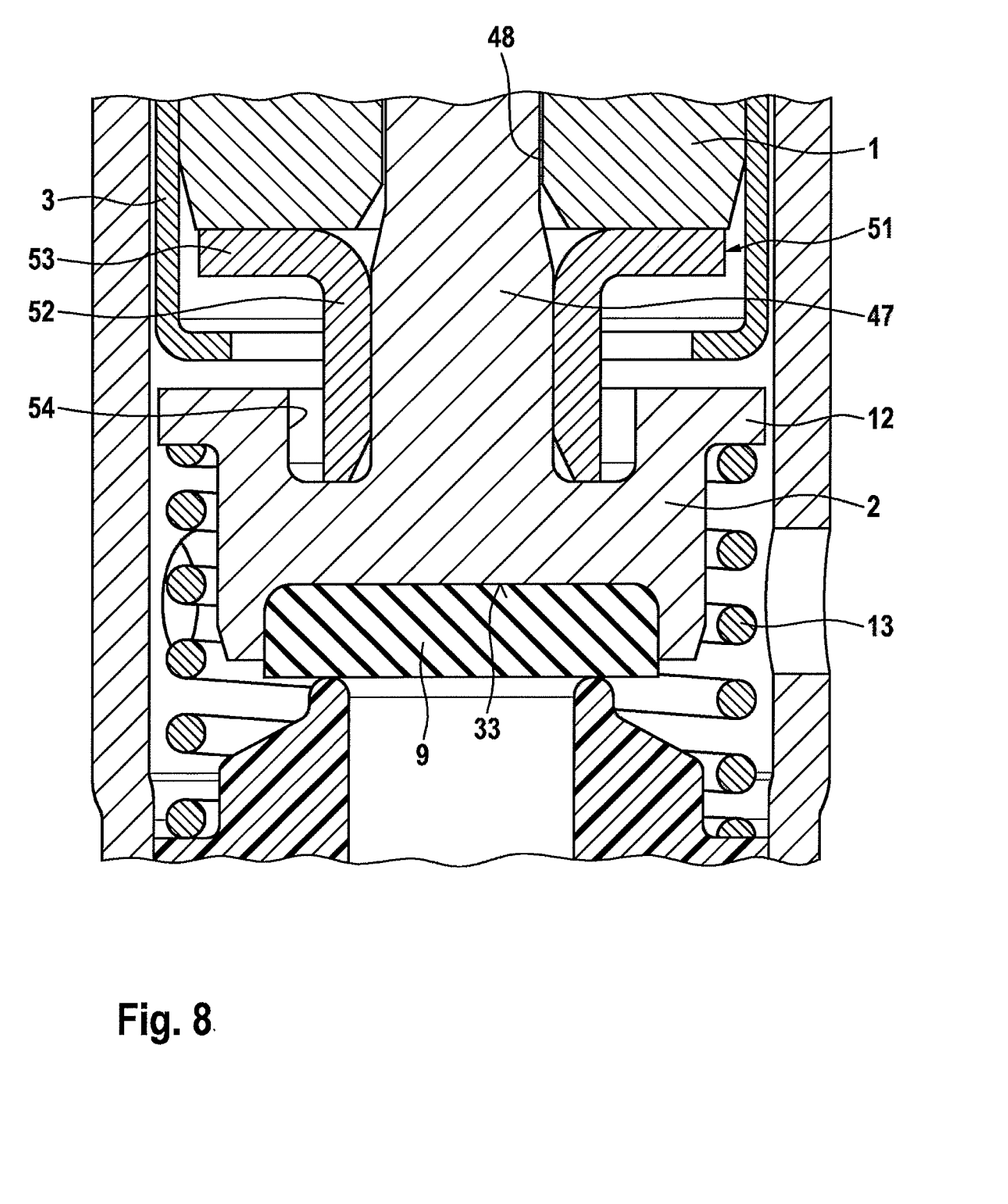
FIG. 8 shows a longitudinal section through the central part of the valve designed in accordance with a seventh embodiment of an aspect of the invention.
Figure 9:
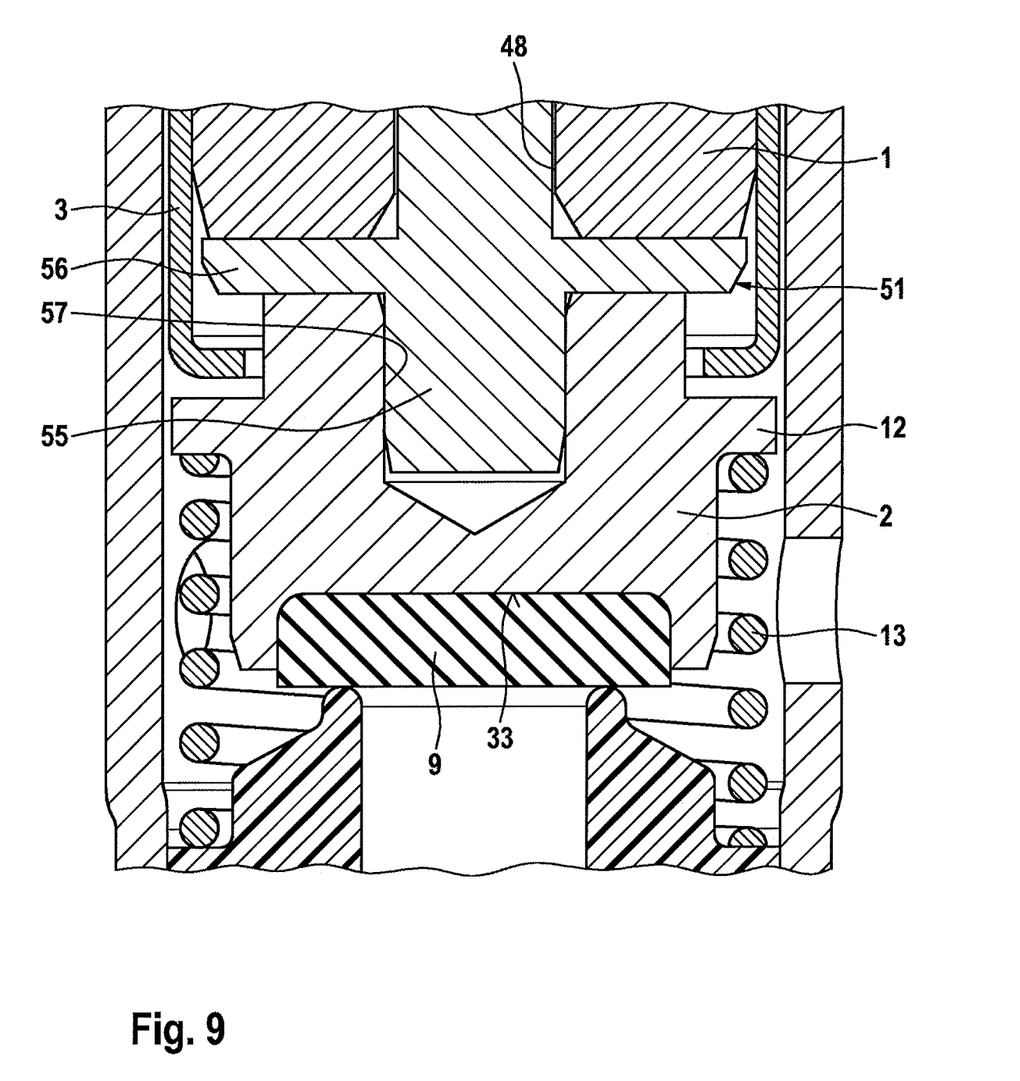
FIG. 9 shows a longitudinal section through the central part of the valve designed in accordance with an eighth embodiment of an aspect of the invention.
Figure 10:
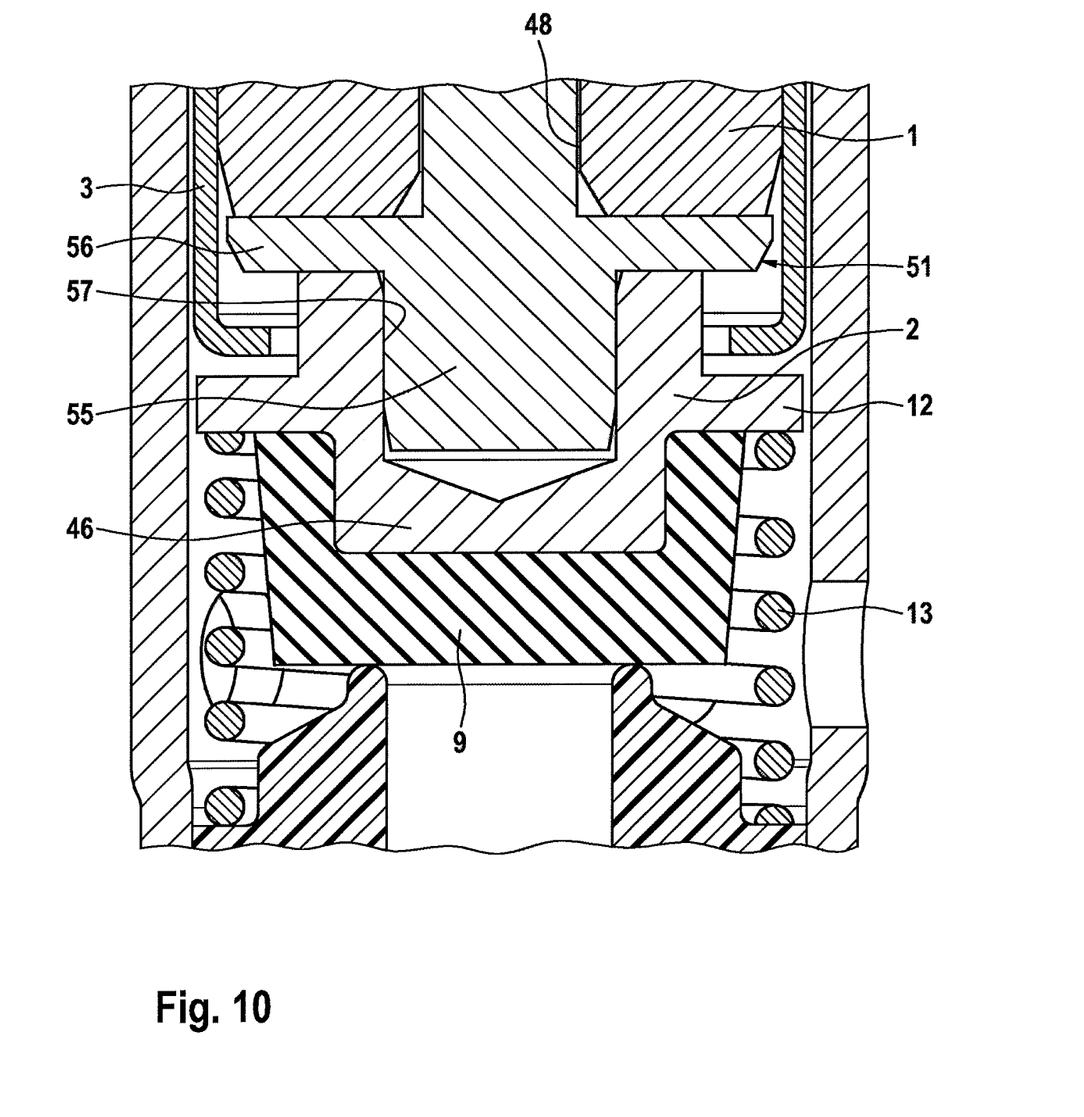
FIG. 10 shows a longitudinal section through the central part of the valve designed in accordance with a ninth embodiment of an aspect of the invention.

As shown in the next embodiments in FIGS. 8 to 10, it is basically possible for a spring pot to be omitted. In this case, the valve closing body 2, as already shown in FIG. 1, has an encircling piston collar 12 on which the valve spring 13 is supported.

In the embodiments as per FIGS. 8 and 9, the valve closing body 2 has a depression 33 in its end surface, into which depression the sealing element 9 of disk-shaped form is adhesively bonded.

It is however also possible, as in FIG. 10, for an undercut-free elevation 46 to be provided on the end side of the valve closing body 2, onto which elevation a pot-shaped sealing element 9 is fitted.

In the embodiment as per FIG. 8, the valve closing body 2 has a rod-shaped rear elongation 47, which is guided in a longitudinal bore 48 of the magnet armature. Between the valve closing body 2 and the magnet armature 1, there is situated an intermediate body 51, which is pressed onto the elongation 47. For this purpose, the intermediate body 51 is designed as a sleeve 52 with a collar 53, wherein the collar 53 bears against the lower end side of the magnet armature 1, and the sleeve 52 projects into a depression 54, which encircles the elongation 47, on the upper end side of the valve closing body 2. The collar extends outward to such an extent that it is engaged under by the driver 3 on the magnet armature 1.

In the embodiments as per FIGS. 9 and 10, the intermediate body 51 is composed of a rod 55 which, in its central section, is equipped with an encircling collar 56. The rod 55 projects with one end into the longitudinal bore 48 of the magnet armature 1 and is pressed with its other end into a blind bore 57 in the upper end side of the valve closing body 2, and thus forms an integral constituent part of the valve closing body 2. The collar 56 is situated between the end sides of the magnet armature 1 and of the valve closing body 2. Also, the collar extends outward to such an extent that it is engaged under by the driver 3 on the magnet armature 1.

| List of reference designations | |
|---|---|
| 1 | Magnet armature |
| 2 | Valve closing body |
| 3 | Driver |
| 9 | Sealing element |
| 10 | Restoring spring |
| 11 | Valve seat |
| 12 | Piston collar |
| 13 | Valve spring |
| 14 | Valve seat body |
| 15 | Valve block |
| 16 | Shoulder |
| 17 | Valve housing |
| 18 | Magnet core |
| 19 | Pressure medium inlet |
| 20 | Valve outlet |
| 21 | Lower housing region |
| 22 | Steel housing section |
| 23 | Sleeve |
| 26 | Undercut |
| 27 | Collar |
| 28 | Spring pot |
| 29 | Collar |
| 30 | Collar |
| 31 | Sealing surface |
| 32 | Tubular section |
| 33 | Depression |
| 34 | |
| 35 | Lower section |
| 36 | Enclosure |
| 37 | Base |
| 38 | Base |
| 39 | Encircling wall |
| 40 | Longitudinal bore |
| 41 | Guide sleeve |
| 42 | Collar |
| 43 | Base |
| 44 | Opening |
| 45 | Elongation |
| 46 | Elevation |
| 47 | Elongation |
| 48 | Longitudinal bore |
| 51 | Intermediate body |
| 52 | Sleeve |
| 53 | Collar |
| 54 | Depression |
| 55 | Rod |
| 56 | Collar |
| 57 | Blind bore |

The invention claimed is:

1. An electromagnetic valve, for a motor vehicle air spring system, having a valve housing in which there are arranged a valve closing body and a valve seat body which has a valve seat and a valve outlet, wherein the valve closing body is displaceable relative to the valve seat in an opening and a closing direction in order to open or close the valve outlet, having a magnet armature which forms an assembly together with the valve closing body, and having a restoring spring which acts on the assembly in a closing direction and having a valve spring which acts on the assembly in an opening direction, wherein, to an end of the valve closing body facing toward and nearest to the valve seat, there is fastened an elastic sealing element which bears sealingly against the valve seat, wherein a spring pot is provided on the valve closing body, which spring pot has a tubular section which surrounds the valve closing body and which has a collar on which the valve spring is supported, and wherein an end of the tubular section opposite the collar projects toward the valve seat beyond the end of the valve closing body facing toward and nearest to the valve seat.

2. The electromagnetic valve as claimed in claim 1, wherein the tubular section of the spring pot bears, non-displaceably in a lateral direction, directly against the valve closing body.

3. The electromagnetic valve as claimed in claim 2, wherein the tubular section of the spring pot is held with an interference fit on a shell radial outer surface of the valve closing body.

4. The electromagnetic valve as claimed in claim 3, wherein a part of the end of the tubular section which projects beyond the end of the valve closing body forms an enclosure for the sealing element.

5. An electromagnetic valve, for a motor vehicle air spring system, having a valve housing in which there are arranged a valve closing body and a valve seat body which has a valve seat and a valve outlet, wherein the valve closing body is displaceable relative to the valve seat in an opening and a closing direction in order to open or close the valve outlet, having a magnet armature which forms an assembly together with the valve closing body, and having a restoring spring which acts on the assembly in a closing direction and having a valve spring which acts on the assembly in an opening direction, wherein, to an end of the valve closing body facing toward the valve seat, there is fastened an elastic sealing element which bears sealingly against the valve seat, wherein a spring pot is provided on the valve closing body, which spring pot has a tubular section which surrounds the valve closing body and which has a collar on which the valve spring is supported, wherein the tubular section of the spring pot bears, non-displaceably in a lateral direction, directly against the valve closing body, wherein the spring pot is equipped with a base which bears against an end surface of the valve closing body, and the sealing element is designed as a pot with a base and with an encircling wall, wherein the sealing element is mounted onto the spring pot, such that an inner surface of the base of said sealing element bears against the base of the spring pot, and wherein the inner side of the encircling wall bears against the tubular section of the spring pot.

6. The electromagnetic valve as claimed in claim 5, wherein the base of the spring pot is closed, and the valve closing body is equipped with a longitudinal bore.

7. An electromagnetic valve, for a motor vehicle air spring system, having a valve housing in which there are arranged a valve closing body and a valve seat body which has a valve seat and a valve outlet, wherein the valve closing body is displaceable relative to the valve seat in an opening and a closing direction in order to open or close the valve outlet, having a magnet armature which forms an assembly together with the valve closing body, and having a restoring spring which acts on the assembly in a closing direction and having a valve spring which acts on the assembly in an opening direction, wherein, to an end of the valve closing body facing toward the valve seat, there is fastened an elastic sealing element which bears sealingly against the valve seat, wherein a spring pot is provided on the valve closing body, which spring pot has a tubular section which surrounds the valve closing body and which has a collar on which the valve spring is supported, and wherein the valve closing body is formed as a guide sleeve, wherein the spring pot is mounted onto the guide sleeve with an interference fit, and the guide sleeve is guided with a clearance fit on an elongation, formed as a guide pin, of the magnet armature.

8. An electromagnetic valve, for a motor vehicle air spring system, having a valve housing in which there are arranged a valve closing body and a valve seat body which has a valve seat and a valve outlet, wherein the valve closing body is displaceable relative to the valve seat in an opening and a closing direction in order to open or close the valve outlet, having a magnet armature which forms an assembly together with the valve closing body, and having a restoring spring which acts on the assembly in a closing direction and having a valve spring which acts on the assembly in an opening direction, wherein, to an end of the valve closing body facing toward the valve seat, there is fastened an elastic sealing element which bears sealingly against the valve seat, wherein the valve closing body has a piston collar on which the valve spring is supported, wherein the sealing element is either recessed in a depression on an end surface of the valve closing body or is of pot-shaped design and bears both against the end side of the valve closing body and against a radial outer surface of the valve closing body, wherein the valve closing body is connected to the magnet armature via an intermediate body, wherein the intermediate body comprises a rod with an encircling collar in a central section thereof, the two ends of the rod are inserted on one side in a blind bore in the valve closing body and at an other side in a longitudinal bore of the magnet armature, and the collar is situated between the opposite end surfaces of magnet armature and valve closing body.

9. An electromagnetic valve, for a motor vehicle air spring system, having a valve housing in which there are arranged a valve closing body and a valve seat body which has a valve seat and a valve outlet, wherein the valve closing body is displaceable relative to the valve seat in an opening and a closing direction in order to open or close the valve outlet, having a magnet armature which forms an assembly together with the valve closing body, and having a restoring spring which acts on the assembly in a closing direction and having a valve spring which acts on the assembly in an opening direction, wherein, to an end of the valve closing body facing toward the valve seat, there is fastened an elastic sealing element which bears sealingly against the valve seat, wherein the valve closing body has a piston collar on which the valve spring is supported, wherein the sealing element is either recessed in a depression on an end surface of the valve closing body or is of pot-shaped design and bears both against the end side of the valve closing body and against a radial outer surface of the valve closing body, wherein the valve closing body has a rod-shaped elongation which protrudes into a longitudinal bore of the magnet armature, wherein, between two end sides of magnet armature and the valve closing body, there is situated an intermediate body which comprises a sleeve with an encircling collar, wherein the collar bears against the end side of the magnet armature, and wherein the sleeve protrudes into an encircling depression on an upper end side of the valve closing body.

10. The electromagnetic valve as claimed in claim 8, wherein the valve spring is arranged coaxially with respect to the sealing element and at the height thereof.

11. The electromagnetic valve as claimed in claim 9, wherein the valve spring is arranged coaxially with respect to the sealing element and at the height thereof.

* * * * *